US012620600B2

(12) United States Patent
Senoue

(10) Patent No.: US 12,620,600 B2
(45) Date of Patent: May 5, 2026

(54) HONEYCOMB TYPE LITHIUM ION BATTERY

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 707 days.

(21) Appl. No.: 17/654,485

(22) Filed: Mar. 11, 2022

(65) Prior Publication Data

US 2022/0311015 A1 Sep. 29, 2022

(30) Foreign Application Priority Data

Mar. 26, 2021 (JP) ................................. 2021-053654

(51) Int. Cl.
*H01M 4/78* (2006.01)
*H01M 4/62* (2006.01)
*H01M 10/0525* (2010.01)
(52) U.S. Cl.
CPC .............. *H01M 4/78* (2013.01); *H01M 4/62* (2013.01); *H01M 10/0525* (2013.01)
(58) Field of Classification Search
None
See application file for complete search history.

(56) References Cited

U.S. PATENT DOCUMENTS

2005/0130039 A1* 6/2005 Shimizu .............. H01M 4/0404
429/217
2014/0335395 A1* 11/2014 Ramasubramanian . H01M 4/74
429/142
2020/0243897 A1* 7/2020 Senoue ............. H01M 10/0525
2022/0336843 A1* 10/2022 Senoue ............... H01M 50/434

FOREIGN PATENT DOCUMENTS

JP 2001126736 A 5/2001

* cited by examiner

*Primary Examiner* — Mark Ruthkosky
(74) *Attorney, Agent, or Firm* — Dickinson Wright, PLLC

(57) ABSTRACT

Provided is a honeycomb type lithium ion battery capable of suppressing short-circuiting due to cracks. The honeycomb type lithium ion battery has an anode, a cathode, and a separator layer, wherein the anode has a plurality of through holes extending in one direction, the separator layer has partition separator layers and insulating film separator layers, the cathode has inner areas disposed inside the through holes via the partition separator layers, intermediate areas disposed over faces of the inner areas and faces of the insulating film separator layers, and a surface area with which surfaces of the insulating film separator layers and the intermediate areas are covered, and the cathode contains a binder, wherein the proportion of the content of the binder in the surface area is high compared to the proportion of the content of the binder in the inner areas.

1 Claim, 4 Drawing Sheets

100

Crack

External
appearance

Crack

Separator    Cathode
             mixture

Photomicrography
of crack

HONEYCOMB TYPE LITHIUM ION BATTERY

FIELD

The present application relates to a honeycomb type lithium ion battery.

BACKGROUND

Patent Literature 1 discloses a honeycomb-structure current collector for an electrode of a lithium ion secondary battery which is formed by coating, with a titanium nitride film, the surfaces of partitions of cells which include the outer surface of a carbonaceous honeycomb structure, and an electrode of a lithium ion secondary battery which is formed by filling the cells of this current collector with an active material for a cathode or an anode.

CITATION LIST

Patent Literature

Patent Literature 1: JP 2001-126736 A

SUMMARY

Technical Problem

As a result of his intensive research on the honeycomb type lithium ion battery, the inventor of the present application found out that when a separator is disposed in through holes of an anode having a honeycomb structure, next a cathode paste is disposed in the through holes, and thereafter a solvent in the cathode paste is dried, shrinkage stress of a binder in the cathode paste applies tensile stress to the separator, which may cause cracks in the battery. The inventor also found out that such cracks may cause the cathode and the anode to be in contact with each other to short-circuit.

In view of the above circumstances, an object of the present disclosure is to provide a honeycomb type lithium ion battery capable of suppressing short-circuiting due to cracks.

Solution to Problem

As one aspect to solve the above problem, the present disclosure is provided with a honeycomb type lithium ion battery having an anode, a cathode, and a separator layer, wherein the anode has a plurality of through holes extending in one direction, the separator layer has Li ion permeability, physically isolates the anode and the cathode from each other, and has partition separator layers and insulating film separator layers, insides of the through holes being covered with the partition separator layers, at least one of opening face parts on one and another sides of the anode being covered with the insulating film separator layers, the cathode has inner areas disposed inside the through holes via the partition separator layers, intermediate areas disposed over faces of the inner areas and faces of the insulating film separator layers, and a surface area with which surfaces of the insulating film separator layers and the intermediate areas are covered, and the cathode contains a binder, wherein a proportion of a content of the binder in the surface area is high compared to a proportion of a content of the binder in the inner areas.

Advantageous Effects

In the honeycomb type lithium ion battery according to the present disclosure, a proportion of the content of the binder in the surface areas is high compared to that in the inner areas. A lower proportion of the content of the binder in the inner areas in the cathode as described above can reduce shrinkage stress that the cathode gives the separator layer in a drying step in a manufacturing process, to suppress cracks. The suppression of cracks can lead to suppression of short-circuiting due to such cracks. A higher proportion of the content of the binder in the surface areas in the cathode makes it possible to retain the shape of the cathode.

DESCRIPTION OF EMBODIMENTS

[Honeycomb Type Lithium Ion Battery]

Figure 1:
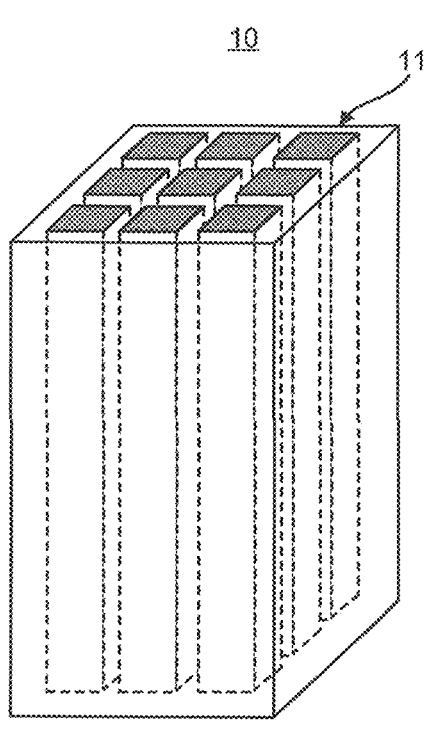
FIG. 1 is a perspective view of an anode 10.
Figure 2:
FIG. 2 is a schematic cross-sectional view of a honeycomb type lithium ion battery 100.
Figure 2:
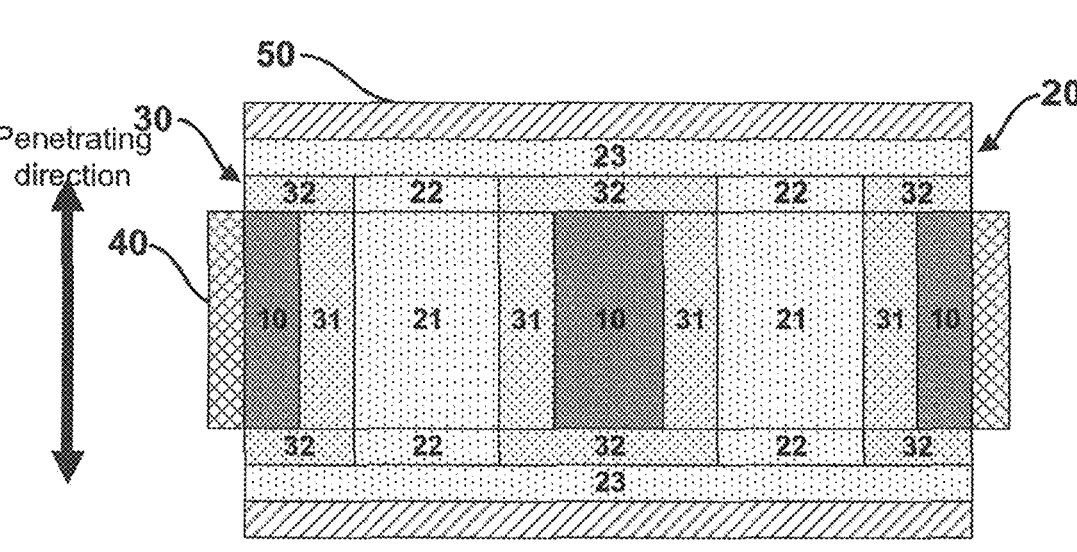

A honeycomb type lithium ion battery according to the present disclosure will be described, making reference to a honeycomb type lithium ion battery 100 that is one embodiment (hereinafter may be referred to as "battery 100"). FIG. 1 is a perspective view of an anode 10. FIG. 2 is a schematic cross-sectional view of the battery 100 taken along the penetrating direction of through holes 11 of the anode 10.

As in FIG. 2, the battery 100 includes the anode 10, a cathode 20 and a separator layer 30. The battery 100 may be also provided with an anode current collector 40 and a cathode current collector 50.

<Anode 10>

The anode 10 has a plurality of the through holes 11 extending in one direction (penetrating direction). Such a structure is called a so-called honeycomb structure. The entire shape of the anode 10 is not particularly limited, but may be a quadrangular prism as in FIG. 1, any other prism, or a cylinder. The entire size of the anode 10 is not particularly limited, but may be suitably set according to the purpose. For example, a height of the anode 10 (length in the penetrating direction, h) may be 3 mm to 100 mm in view of improving strength. A diameter (d) of the anode 10 may be 10 mm to 100 mm. Further, an aspect ratio (h/d) of the height (h) to the diameter (d) of the anode 10 may be 0.1 to 10.

A shape of each of the through holes 11 provided in the anode 10 is not particularly limited. For example, a cross section of the through hole 11 which is orthogonal to the penetrating direction may have a circular shape, or a polygonal shape such as a regular hexagon. A hole diameter of the through hole 11 is not particularly limited as long as the cathode 20 and the separator layer 30 can be disposed inside the through hole 11. The hole diameter is, e.g., in the range of 10 μm and 1000 μm. The hole diameter means a maximum diameter. A cross-sectional area of the through hole 11 is not particularly limited, but may be 900 μm² to 490000 μm². There are no particular limitations to a space (rib thickness) between any adjacent through holes 11 as long as the ribs can have such strength that the through holes 11 are supported. For example, the space ranges from 20 μm to 350

μm. The through holes 11 may be randomly arranged in the anode 10. In view of a secure filling volume of the cathode 20 to improve the capacity, the through holes 11 are preferably formed as regularly aligned as in FIG. 1.

The anode 10 contains an anode active material. Examples of the anode active material include carbon-based anode active materials such as graphite, graphitizable carbons, and nongraphitizable carbons, and alloy-based anode active materials containing silicon (Si), tin (Sn), or the like. A mean particle diameter of the anode active material is, for example, in the range of 5 and 50 μm. The anode 10 contains the anode active material in the range of, for example, 50 wt % and 99 wt %.

Here, in this description, "mean particle diameter" is a particle diameter at the integrated value of 50% (median diameter) in a volume-based particle diameter distribution that is measured using a laser diffraction and scattering method.

The anode 10 may optionally contain a binder. Examples of the binder include carboxymethyl cellulose; rubber-based binders such as butadiene rubber, hydrogenated butadiene rubber, styrene-butadiene rubber (SBR), hydrogenated styrene-butadiene rubber, nitrile butadiene rubber, hydrogenated nitrile butadiene rubber and ethylene propylene rubber; fluoride-based binders such as polyvinylidene fluoride (PVDF), polyvinylidene fluoride-polyhexafluoropropylene copolymer (PVDF-HFP), polytetrafluoroethylene, and fluororubber; polyolefin-based thermoplastic resins such as polyethylene, polypropylene, and polystyrene; imide-based resins such as polyimide, and polyamideimide; amide-based resins such as polyamide; acrylic resins such as polymethylacrylate, and polyethylacrylate; and methacrylic resins such as polymethyl methacrylate, and polyethyl methacrylate. The anode 10 contains the binder in the range of, for example, 0.1 wt % and 10 wt %.

The anode 10 may optionally contain a conductive aid. Examples of the conductive aid include carbon materials and metallic materials. Examples of the carbon materials include particulate carbonaceous materials such as acetylene black (AB), and Ketjenblack (KB); carbon fibers such as VGCF; and fibrous carbon materials such as carbon nanotubes (CNTs), and carbon nanofibers (CNFs). Examples of the metallic materials include Ni, Cu, Fe and SUS. The metallic materials are preferably particulate or fibrous. The anode 10 contains the conductive aid in the range of, for example, 0.1 wt % and 10 wt %.

<Separator Layer 30>

The separator layer 30 has Li ion permeability, and physically isolates the anode 10 and the cathode 20. The separator layer 30 may be a porous film in view of securing ion permeability. The separator layer 30 has partition separator layers 31 with which the insides of the through holes 11 are covered, and insulating film separator layers 32 with which at least one of opening face parts on one and the other sides of the anode 10 (surfaces in the penetrating direction) is covered. FIG. 2 shows an embodiment where both the opening face parts of the anode 10 are covered with the insulating film separator layers 32.

The partition separator layers 31 physically isolate the inner surfaces of the through holes 11 and inner areas 21 of the cathode 20 which will be described later. A thickness of each of the partition separator layers 31 is not particularly limited, but for example, is in the range of 10 μm and 100 μm.

The partition separator layers 31 contain an inorganic particle such as alumina, boehmite, titania, magnesia, and zirconia. A mean particle size of the inorganic particle is, for example, in the range of 10 nm and 50 μm. The partition separator layers 31 contain the inorganic particle, for example, in the range of 20 wt % and 99 wt %. The partition separator layers 31 may also contain a binder. A binder that may be contained in the partition separator layers 31, a content thereof, etc. may be suitably selected from the binders that may be used in the anode 10, the contents thereof.

The insulating film separator layers 32 physically isolate the opening face parts of the anode 10 and surface areas 23 of the cathode 20 which will be described later. A thickness of each of the insulating film separator layers 32 is not particularly limited, but for example, is in the range of 10 μm and 1000 μm. Materials of the insulating film separator layers 32 include an inorganic particle. The insulating film separator layers 32 may also contain a binder. These materials may be suitably selected from those which may be used in the partition separator layers 31, and the contents thereof.

<Cathode 20>

The cathode 20 has the inner areas 21 disposed inside the through holes 11 via the partition separator layers 31, intermediate areas 22 disposed over faces of the inner areas 21 and faces of the insulating film separator layers 32, and the surface areas 23, with which the surfaces of the insulating film separator layers 32 and the intermediate areas 22 are covered.

The inner areas 21 are areas of the cathode 20 which fill the through holes 11 only, with which the partition separator layers 31 are covered. The inner areas 21 contain a cathode active material. Examples of the cathode active material include lithium cobaltate, lithium nickelate, lithium manganate, lithium nickel cobalt manganates, lithium nickel cobalt aluminates, and lithium iron phosphate. A mean particle size of the cathode active material is, for example, in the range of 5 and 100 μm. The cathode 20 contains the cathode active material, for example, in the range of 50 wt % and 99 wt %.

The inner areas 21 may also contain a conductive aid. A material and a content of the conductive aid may be suitably selected from the conductive aids that may be used in the anode 10, and the contents thereof.

The inner areas 21 may also contain a binder. As the binder, any binder that may be used in the anode 10 may be selected. A content of the binder in the inner areas 21 will be described later.

The surface areas 23 are areas of the cathode 20 with which opening face parts of the anode 10, with which the insulating film separator layers 32 are covered, are covered. The surface areas 23 contain the cathode active material, and may optionally contain a conductive aid and a binder. Materials and the surface areas 23 and contents thereof may be suitably selected from materials that may be used in the inner areas 21, and the contents thereof. It is noted that a content of the binder is as described later. A thickness of each of the surface areas 23 is not particularly limited, but for example, is in the range of 10 μm and 1000 μm.

The intermediate areas 22 are areas among the inner areas 21 and the surface areas 23 in the cathode 20. The intermediate areas 22 contain the cathode active material, and may optionally contain a conductive aid and a binder. Materials of the intermediate areas 22 and contents thereof may be suitably selected from materials that may be used in the inner areas 21, and the contents thereof. Thicknesses of the intermediate areas 22 may be equal to the insulating film separator layers 32.

As described later, in a process of manufacturing the battery 100, the cathode 20 is prepared by: filling the through holes 11 with a cathode mixture paste that is to constitute the inner areas 21; drying the resultant; and thereafter disposing a cathode mixture that is to constitute the surface areas 23 on the opening face parts on the through holes 11. Thus, boundaries between areas of the material constituting the inner areas 21 and areas of the material constituting the surface areas are present in the intermediate areas 22. The aspects of the intermediate areas 22 vary according to positions of the boundaries. Specifically, when the boundary is in contact with the surface area 23, the intermediate area 22 is constituted of the material constituting the inner area 21, when the boundary is in contact with the inner area 21, the intermediate area 22 is constituted of the material constituting the surface area 23, and when the boundary is in the intermediate area 22, an area (inner side area) constituted of the material constituting the inner area 21 and an area (opening part side area) constituted of the material constituting the surface area 23 are mixed in the intermediate area 22.

Here, the cathode 20 contains a binder as described above. The cathode 20 has a feature that the proportion of the content of the binder in the surface areas 23 is high compared to that in the inner areas 21.

Figure 3:
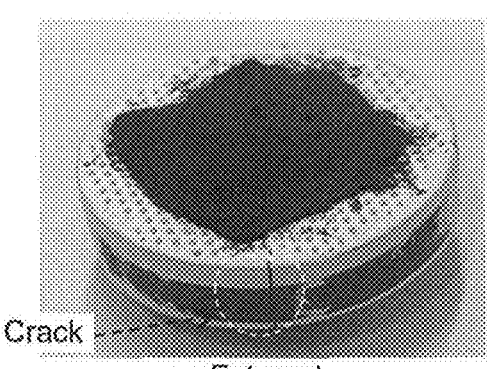
FIG. 3 is a photograph of a cracking honeycomb type lithium ion battery.
Figure 3:
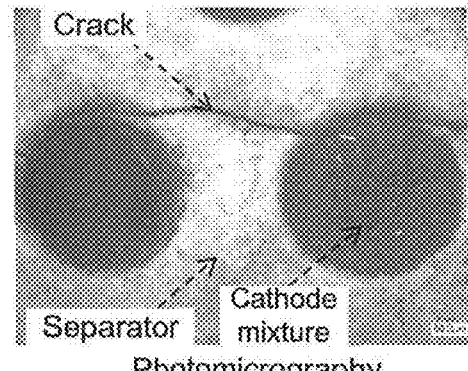

A lower proportion of the content of the binder in the inner areas 21 in the cathode 20 as described above can reduce shrinkage stress that the cathode 20 (inner areas) gives the separator layer 30 (partition separator layers 31) in a drying step in the manufacturing process, to suppress cracks. The suppression of cracks can lead to suppression of short-circuiting due to such cracks. For reference, FIG. 3 shows a photograph of a cracking honeycomb type lithium ion battery. A higher proportion of the content of the binder in the surface areas in the cathode 20 makes it possible to retain the shape of the cathode.

The inner areas 21 may contain the binder of 1 wt % or less, which may be 0 wt %. The surface areas 23 may contain the binder of 2 wt % or more if prepared by a dry process, which may be at least 2 wt % and less than 3 wt % if prepared by a wet process. If the surface areas 23 are prepared by a dry process, the upper limit of the proportion of the content of the binder is not particularly limited, but for example, the binder of 5 wt % or less may be contained. If prepared by a dry process, the surface areas 23 containing the binder under 2 wt % make it difficult to keep the shape retention thereof. The surface areas 23 prepared by a wet process preferably contain the binder of 2 wt % to 2.5 wt %. The reason why the surface areas 23 prepared by a wet process are allowed to contain the binder of 2 wt % or more and less than 3 wt % while the inner areas 21 prepared by a wet process may contain the binder of 1 wt % or less is not sure. This is imagined to be because the surface areas 23 have many opening faces compared with the inner areas 21, which are structurally blocked, and thus deformation thereof can relatively relax stress when a paste to constitute the surface areas 23 is dried.

A preferred binder contained in the inner areas 21 is a PVDF. A preferred binder contained in the surface areas is a PTFE if the surface areas are prepared in a dry process, and a PVDF if the surface areas are prepared in a wet process.

<Anode Current Collector 40>

The battery 100 may be provided with the anode current collector 40. For example, the anode current collector 40 is disposed on a side face of the anode 10. Examples of the material of the anode current collector 40 include SUS, Cu, Al, Ni, Fe, Ti, Co, and Zn.

<Cathode Current Collector 50>

The battery 100 may be provided with the cathode current collector 50. The cathode current collector 50 is disposed on the cathode 20. In FIG. 2, the cathode current collectors 50 are connected to the surface areas disposed on the surfaces of the battery 100 in the penetrating direction. Examples of the material of the cathode current collector 50 include SUS, Cu, Al, Ni, Fe, Ti, Co, and Zn.

<Electrolytic Solution>

An electrolytic solution may be used for the battery 100. When used, an electrolytic solution is injected all over the inside of the electrode body (specifically, all the vacancies of the anode 10, the cathode 20, and the separator layer 30). As the electrolytic solution, desirably, a nonaqueous electrolyte containing a lithium salt is a major constituent. Examples of the nonaqueous electrolyte include ethylene carbonate, diethyl carbonate, dimethyl carbonate, and ethyl methyl carbonate. One of them may be used alone, or they may be used in combination. Examples of the lithium salt include $LiPF_6$ and $LiBF_4$. The concentration of the lithium salt in the electrolytic solution may be, for example, 0.005 mol/L to 0.5 mol/L.

The honeycomb type lithium ion battery according to the present disclosure has been described using the honeycomb type lithium ion battery 100, which is one embodiment. The honeycomb type lithium ion battery according to the present disclosure is capable of suppressing short-circuiting due to cracks.

[Method of Manufacturing Honeycomb Type Lithium Ion Battery]

Next, a method of manufacturing a honeycomb type lithium ion battery according to the present disclosure will be described, making reference to a method 1000 of manufacturing a honeycomb type lithium ion battery which is one embodiment (hereinafter may be referred to as "manufacturing method 1000").

Figure 4:
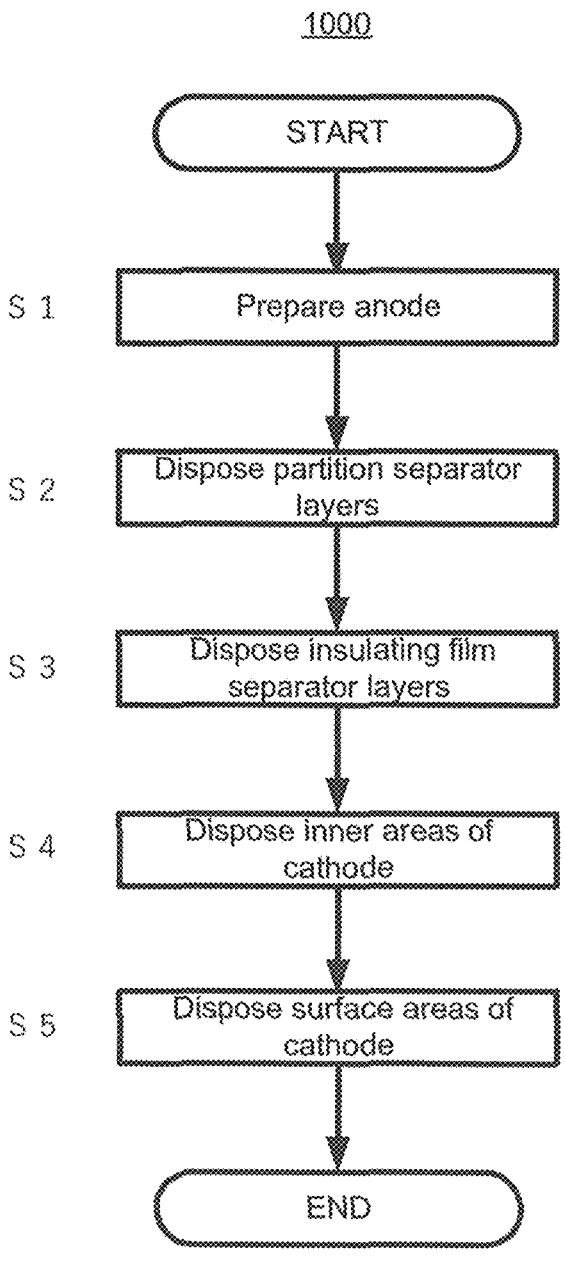
FIG. 4 is a flowchart of a method 1000 of manufacturing a honeycomb type lithium ion battery.

The manufacturing method 1000 is a method of manufacturing a honeycomb type lithium ion battery having an anode, a cathode, and a separator layer. FIG. 4 is a flowchart of the manufacturing method 1000. As in FIG. 4, the manufacturing method 1000 has Steps S1 to S5. Hereinafter each step will be described.

<Step S1>

Step S1 is a step of preparing an anode having a plurality of through holes extending in one direction. A method of preparing such an anode of a honeycomb structure is not particularly limited, but an example thereof is as follows. First, an anode material to constitute the anode is mixed with a solvent (e.g., water) to be a slurry. Next, the slurry is subjected to extrusion molding through a predetermined metal mold, and is heated for a predetermined time to be dry. According to this, the anode can be prepared. Here, the drying temperature is not particularly limited, but is, for example, in the range of 50° C. and 200° C. The drying time is not particularly limited, but is in the range of 10 minutes and 2 hours.

<Step S2>

Step S2 is performed after Step S1, and is a step of covering the inner surfaces of the through holes of the anode with partition separator layers. A method of covering with the partition separator layers as the foregoing is not particularly limited, but an example thereof is as follows. First, a material to constitute the partition separator layers is mixed and kneaded with a solvent (e.g., an organic solvent) to be a paste. Next, the paste is disposed on one face (opening face) of the anode in the penetrating direction, and suction is exerted at the opposite face to adhere the paste to the inner walls of the through holes. Subsequently, the anode to which the paste adheres is heated for a predetermined time to be dry. According to this, the inner walls of the through holes can be covered with the partition separator layers. Here, the drying temperature is not particularly limited, but is, for example, in the range of 50° C. and 200° C. The drying time is not particularly limited, but is in the range of 10 minutes and 2 hours.

<Step S3>

Step S3 is performed after Step S2, and is a step of covering opening face parts of the anode with insulating film separator layers. A method of covering with the insulating film separator layers as the foregoing is not particularly limited, but an example thereof is as follows. First, if adhering to the opening face parts of the anode in Step S2, an excess portion of the partition separator layers is rubbed with sandpaper or the like to expose the opening face parts of the anode. Next, a material to constitute the insulating film separator layers is put into and is uniformly diffused across a solution for electrodeposition which contains the binder. Subsequently, a metal tab (e.g., Ni) for electrodeposition is disposed on a side face of the anode. Then, this anode is put into the prepared solution, and a predetermined voltage is applied thereto, to electrodeposit the material. After the electrodeposition, the anode is washed with water or the like and is heat-treated at a predetermined temperature. According to this, the opening face parts of the anode can be covered with the insulating film separator layers.

<Step S4>

Step S4 is performed after Step S3, and is a step of disposing inner areas of the cathode inside the through holes via the partition separator layers. A method of disposing the inner areas as the foregoing is not particularly limited, but example thereof is as follows. First, a material to constitute the inner areas of the cathode is mixed and kneaded with a solvent (e.g., an organic solvent) to be a paste. Next, the pasty material is disposed on the opening face parts of the anode. Subsequently, the anode is disposed inside a syringe, and pressure is applied using the syringe to push the material of the inner areas of the cathode into the through holes. The resultant is heated for a predetermined time to be dry, whereby the inner areas of the cathode can be disposed inside the through holes. Here, the drying temperature is not particularly limited, but is, for example, in the range of 50° C. and 200° C. The drying time is not particularly limited, but is in the range of 10 minutes and 2 hours.

Other than the above described method, a method of disposing the pasty material on the opening face parts of the anode, and exerting suction at the opposite face to make the material flow into the through holes may be also employed.

Step S5 is performed after Step S4, and is a step of disposing a surface area of the cathode on at least one of the opening face parts of the anode, on which the insulating film separator layers are formed. A method of disposing the surface area as the foregoing is not particularly limited, but example thereof is as follows.

If the surface area is prepared by a dry process, first, a material to constitute the surface area of the cathode is mixed with a mortar or the like to be clayey, and thereafter to be powdery with a mixer. The powdery material is disposed on an opening face part of the anode, on which the insulating film separator layers are formed, to be pressed down. Whereby the surface area of the cathode can be disposed. The press pressure is not particularly limited, but for example, is in the range of 0.1 kN and 10 kN.

If the surface area is prepared by a wet process, first, a material to constitute the surface area of the cathode is mixed and kneaded with a solvent (e.g., an organic solvent)

to be a paste. Then, the paste is disposed on an opening face part of the anode, on which the insulating film separator layers are formed, to be heated for a predetermined time to be dry. Whereby the surface area of the cathode can be disposed. The drying temperature is not particularly limited, but is, for example, in the range of 50° C. and 200° C. The drying time is not particularly limited, but is in the range of 10 minutes and 2 hours.

Either a dry process or a wet process may be applied to the process of disposing the surface area. Preferably, the surface area may be provided by a dry process in order not to give the insulating film separator layers shrinkage stress, since being in contact with the insulating film separator layers just thereunder.

Here, in one or both of Steps S4 and S5, the intermediate areas of the cathode are disposed. That is, a particular step of disposing the intermediate areas is not necessary. In Step S5, the surface areas of the cathode may be disposed on both surfaces of the anode, where the insulating film separator layers are formed.

When an electrolytic solution is used in the battery to be manufactured, a step of injecting an electrolytic solution all over the inside of the electrode body (specifically, all of the vacancies of the anode 10, the cathode 20, and the separator layer 30) may be included after the step S5.

The method of manufacturing a honeycomb type lithium ion battery according to the present disclosure has been described using the manufacturing method 1000. The method of manufacturing a honeycomb type lithium ion battery according to the present disclosure makes it possible to manufacture a honeycomb type lithium ion battery capable of suppressing short-circuiting due to cracks.

EXAMPLES

Hereinafter the present disclosure will be further described using Examples.

[Preparation of Evaluation Battery]

Evaluation batteries according to Examples 1 to 6 and Comparative Examples 1 to 6 were prepared as follows.

Example 1

<Preparation of Anode>

A slurry was prepared by mixing 100 parts by weight of a natural graphite fine particle having a mean particle diameter of 15 μm, 10 parts by weight of carboxy methylcellulose, and 60 parts by weight of ion-exchanged water. Next, the slurry was subjected to extrusion molding through a predetermined metal mold, and was dried at 120° C. for 3 hours. Then the resultant anode was obtained. The anode had a circular cross-sectional shape of 20 mm in diameter, and was provided with a plurality of through holes each having a regular hexagonal shape of 350 μm in side length on this cross section. Any adjacent through holes were arranged at regular intervals. These intervals (rib thicknesses) were 250 μm each. The length of the anode in the penetrating direction was 1 cm.

(Disposing Partition Separator Layers)

A paste was prepared by mixing and kneading 45 parts by weight of a boehmite fine particle having a mean particle diameter of 100 nm, 4 parts by weight of a PVDF (#8500 from KUREHA CORPORATION), and 40 parts by weight of NMP. The paste was adhered to the inner walls of the through holes by: placing approximately 3 g to 5 g thereof on one opening surface part of the anode in the penetrating direction; and exerting suction by a vacuum pump at the opposite opening surface part. Next, this anode was dried at 120° C. for 15 minutes, and thus partition separator layers were fixed to the inner walls of the through holes. The thicknesses of the partition separator layers were approximately 40 μm each.

(Disposing Insulating Film Separator Layers)

Both the opening surface parts of the anode, where the partition separator layers were disposed, in the penetrating direction were processed so that excess portions of the partition separator layers which were fixed to the surfaces were rubbed with sandpaper to expose the opening surface parts of the anode.

Subsequently, insulating film separator layers were disposed on the opening face parts of the anode. First, 30 parts by weight of a boehmite fine particle having a mean particle diameter of 100 nm, and 90 parts by weight of ion-exchanged water were put into 25 parts by weight of a PI solution for electrodeposition (Elecoat PI from Shimizu co. ltd.) where a polyimide fine particle were dispersed, and were diffused until uniform. The anode, around a side surface (circumferential side surface) of which a Ni tab was wound in advance, was put into the resultant solution. Next, the separator layers were electrodeposited over the opening surfaces with a voltage of 15V applied for 2 minutes as the anode side was − and the working electrode side was +. The anode after the electrodeposition was roughly washed with water, so that an excess electrodeposition solution was removed, to be heat-treated at 180° C. for 1 hour. Thus, the insulating film separator layers were disposed on both surfaces of the anode in the penetrating direction. The thicknesses of the insulating film separator layers were approximately 36 μm each.

(Disposing Inner Areas of Cathode)

A paste was prepared by mixing and kneading 94 parts by weight of lithium cobaltate having a mean particle diameter of 10 μm, 5 parts by weight of acetylene black, 1 part by weight of a PVDF (#1300 from KUREHA CORPORATION), and 30 parts by weight of NMP. Next, the paste was injected into the through holes by: fixing the anode in a plastic syringe; putting 3.5 g of the paste into this syringe; and applying pressure using the syringe. The syringe was stopped being pushed when it was visually confirmed that the paste came out of the opening face part on the opposite side of the injection side. Then, the anode was taken out from the plastic syringe and dried up at 120° C. for 30 minutes. In this step, the amount of the paste was adjusted so that the material was not excessively left on the opening face parts of the anode.

(Disposing Surface Areas of Cathode)

With a mortar, 92 parts by weight of lithium cobaltate having a mean particle diameter of 10 μm, 4 parts by weight of acetylene black, and 4 parts by weight of a PTFE powder were kneaded for 30 minutes, to be mixed until being clayey. This clayey mixture was crumbled to powder with a mixer. On one opening face part of the anode, 0.2 g of the resultant was put. Next, the resultant with the powder on was pressed down with a benchtop press at a pressure of approximately 1 kN, so that a surface area was fixed. This operation was also performed on the other opening face part. According to the foregoing, an evaluation battery according to Example 1 was prepared.

Example 2

An evaluation battery according to Example 2 was prepared in the same manner as in Example 1 except that in the inner areas, the binder was 0 part by weight and lithium cobaltate was 95 parts by weight.

Example 3

An evaluation battery according to Example 3 was prepared in the same manner as in Example 1 except that in the surface areas, the binder was 2 parts by weight and lithium cobaltate was 94 parts by weight.

Example 4

An evaluation battery according to Example 4 was prepared in the same manner as in Example 1 except that in the surface areas, the binder was 5 parts by weight and lithium cobaltate was 91 parts by weight.

Example 5

An evaluation battery according to Example 5 was prepared in the same manner as in Example 1 except that the step of disposing the surface areas of the cathode was carried out by the following wet process. In the step of disposing the surface areas, first, a wet paste was prepared by mixing 94 parts by weight of lithium cobaltate having a mean particle diameter of 10 μm, 4 parts by weight of acetylene black, 2 parts by weight of a PVDF (#1300 from KUREHA CORPORATION), and 30 parts by weight of NMP. Next, approximately 0.4 g of the paste was put on one opening face part of the anode, and processed with a spatula so as to be planar. Then, the anode was vacuum-dried at 130° C. for 30 minutes. This operation was also performed on the other opening face part.

Example 6

An evaluation battery according to Example 6 was prepared in the same manner as in Example 5 except that in the surface areas, the binder was 2.5 parts by weight and lithium cobaltate was 93.5 parts by weight.

Comparative Example 1

An evaluation battery according to Comparative Example 1 was prepared in the same manner as in Example 1 except that in the inner areas, the binder was 3 parts by weight and lithium cobaltate was 92 parts by weight.

Comparative Example 2

An evaluation battery according to Comparative Example 2 was prepared in the same manner as in Example 1 except that in the inner areas, the binder was 1.5 parts by weight and lithium cobaltate was 93.5 parts by weight.

Comparative Example 3

An evaluation battery according to Comparative Example 3 was prepared in the same manner as in Example 1 except that in the surface areas, the binder was 1.5 parts by weight and lithium cobaltate was 93.5 parts by weight.

Comparative Example 4

An evaluation battery according to Comparative Example 4 was prepared in the same manner as in Example 1 except that in the inner areas, the binder was 0 part by weight and lithium cobaltate was 95 parts by weight, and in the surface areas, the binder was 0 part by weight and lithium cobaltate was 95 parts by weight.

Comparative Example 5

An evaluation battery according to Comparative Example 5 was prepared in the same manner as in Example 5 except that in the surface areas, the binder was 3 parts by weight and lithium cobaltate was 92 parts by weight.

Comparative Example 6

An evaluation battery according to Comparative Example 6 was prepared in the same manner as in Example 5 except that in the surface areas, the binder was 4 parts by weight and lithium cobaltate was 91 parts by weight.

[Evaluation]

A resistance between the cathode on one side and the anode on a side face side in each of the prepared evaluation batteries was measured. When the measured resistance was lower than 1 MΩ, it was determined that the cathode and the anode short-circuited, and when the resistance was at least 1 MΩ, it was determined that the cathode and the anode were insulated. The results are shown in Table 1. "O.L." in Table 1 indicates that the resistance was beyond the measurement limit (10000 kΩ) of the tester.

Table 1 dry process is 2 to 5 wt %. Examples 5 to 6 and Comparative Examples 5 to 6 proved that a short circuit does not occur if the inner areas contain the binder of 1 wt % or less, and the binder in the surface areas prepared by a wet process is 2 to 2.5 wt %.

REFERENCE SIGNS LIST

10 anode
20 cathode
21 inner area
22 intermediate area
23 surface area
30 separator layer
31 partition separator layer
32 insulating film separator layer
40 anode current collector
50 cathode current collector
100 honey comb type lithium ion battery

What is claimed is:

1. A honeycomb type lithium ion battery having an anode, a cathode, and a separator layer,
  wherein the anode has a plurality of through holes extending in one direction,
  the separator layer has Li ion permeability, physically isolates the anode and the cathode from each other, and has partition separator layers and insulating film sepa-

TABLE 1

| | Inner areas of cathode | | Surface areas of cathode | | | |
| | Binder | | Binder | | Evaluation | |
| | (Preparation method) | Content (wt %) | (Preparation method) | Content (wt %) | Resistance value (kΩ) | Determination |
|---|---|---|---|---|---|---|
| Example 1 | PVDF (wet) | 1 | PTEF (dry) | 4 | O.L. | insulated |
| Example 2 | — | 0 | PTEF (dry) | 4 | O.L. | insulated |
| Example 3 | PVDF (wet) | 1 | PTEF (dry) | 2 | O.L. | insulated |
| Example 4 | PVDF (wet) | 1 | PTEF (dry) | 5 | O.L. | insulated |
| Example 5 | PVDF (wet) | 1 | PVDF (wet) | 2 | 3200 | insulated |
| Example 6 | — | 0 | PVDF (wet) | 2.5 | 2700 | insulated |
| Comparative Example 1 | PVDF (wet) | 3 | PTEF (dry) | 4 | 0.5 | short-circuited |
| Comparative Example 2 | PVDF (wet) | 1.5 | PTEF (dry) | 4 | 45 | short-circuited |
| Comparative Example 3 | PVDF (wet) | 1 | PTEF (dry) | 1.5 | impossible to process | |
| Comparative Example 4 | — | 0 | — | 0 | impossible to process | |
| Comparative Example 5 | PVDF (wet) | 1 | PVDF (wet) | 3 | 24 | short-circuited |
| Comparative Example 6 | PVDF (wet) | 1 | PVDF (wet) | 4 | 5 | short-circuited |

[Results]

In Examples 1 to 6, the cathode and the anode were insulated. Therefore, in Examples 1 to 6, it is considered that cracks were suppressed in the process of manufacturing the battery. In contrast, in Comparative Examples 1, 2, 5 and 6, a short circuit occurred. Therefore, it is considered that the battery cracked in Comparative Examples 1 2, 5 and 6. In Comparative Examples 3 and 4, the surface areas of the cathode tended to flake off, so that the shape was not able to be stably retained.

The results are reviewed in more detail. Examples 1 to 4 and Comparative Examples 1 to 2 proved that a short circuit does not occur if the inner areas contain the binder of 1 wt % or less, and the binder in the surface areas prepared by a rator layers, insides of the through holes being covered with the partition separator layers, opening face parts on one and another sides of the through holes being covered with the insulating film separator layers,
  the cathode has inner areas disposed inside the through holes via the partition separator layers, intermediate areas disposed over faces of the inner areas and faces of the insulating film separator layers, and a surface area with which surfaces of the insulating film separator layers and the intermediate areas are covered, and
  the cathode contains a binder, wherein a proportion of a content of the binder in the surface area is 2 wt % or more and 5 wt % or less, and a proportion of a content of the binder in the inner areas is 1 wt % or less.

\* \* \* \* \*